(12) United States Patent
Cassella

(10) Patent No.: US 9,575,464 B2
(45) Date of Patent: Feb. 21, 2017

(54) NON-MECHANICAL DIGITAL/HOLOGRAPHIC WIDE ANGLE CONTROL OF ONE OR MORE LASERS BEAMS

(71) Applicant: Vincent A. Cassella, Springfield, VA (US)

(72) Inventor: Vincent A. Cassella, Springfield, VA (US)

(73) Assignee: Vincent A Cassella, Springfield, VA (US)

( * ) Notice: Subject to any disclaimer, the term of this patent is extended or adjusted under 35 U.S.C. 154(b) by 162 days.

(21) Appl. No.: 14/205,803

(22) Filed: Mar. 12, 2014

(65) Prior Publication Data

US 2014/0268262 A1    Sep. 18, 2014

Related U.S. Application Data

(60) Provisional application No. 61/788,782, filed on Mar. 15, 2013.

(51) Int. Cl.
*G03H 1/22* (2006.01)
*G03H 1/26* (2006.01)
*G03H 1/04* (2006.01)

(52) U.S. Cl.
CPC .......... *G03H 1/2294* (2013.01); *G03H 1/0443* (2013.01); *G03H 1/265* (2013.01); *G03H 2001/0439* (2013.01)

(58) Field of Classification Search
CPC .......... G02F 1/29; G02F 1/292; G03H 1/0441; G03H 1/0443; G03H 1/22; G03H 1/2294; G03H 1/265; G03H 2001/0419; G03H 2001/2228; G03H 2001/2231; G03H 2001/2234

USPC .. 359/1, 3, 9, 10, 11, 21, 22, 23, 24, 25, 27, 359/29, 30, 32, 33, 35; 430/1, 2
See application file for complete search history.

(56) References Cited

U.S. PATENT DOCUMENTS

| | | | |
|---|---|---|---|
| 3,572,895 A | 3/1971 | Schmidt | |
| 3,980,389 A | 9/1976 | Huignard et al. | |
| 5,483,365 A * | 1/1996 | Pu | G11B 7/0065 359/10 |
| 7,215,472 B2 | 5/2007 | Smith et al. | |
| 8,320,031 B1 * | 11/2012 | Sox | G03H 1/0005 250/201.9 |

(Continued)

*Primary Examiner* — Bumsuk Won
*Assistant Examiner* — Ephrem Mebrahtu
(74) *Attorney, Agent, or Firm* — US Naval Research Laboratory; Suresh Koshy

(57) ABSTRACT

An apparatus including a laser generating a plane wave beam, a first beam splitter splitting the plane wave beam into a first reference laser beam and at least one ideal input beam, at least one second beam splitter, and an angle-magnifying optical element. The at least one second beam splitter reflects the at least one ideal input beam through the angle-magnifying optical element to generate at least one distorted input beam. The apparatus further includes a focal plane array receiving the first reference laser beam and the at least one distorted input beam and recording at least one interference pattern generated by the first reference laser beam and the at least one distorted input beam. The apparatus further includes a spatial light modulator generating the at least one recorded interference pattern, receiving the reference laser beam, and transmitting at least one time-reversed output beam through the angle-magnifying optical element.

11 Claims, 6 Drawing Sheets

(56) References Cited

U.S. PATENT DOCUMENTS

| | | | | |
|---|---|---|---|---|
| 8,873,361 | B2* | 10/2014 | Nakamura | G11B 7/0065 359/32 |
| 2004/0090899 | A1* | 5/2004 | Gladney | G03H 1/26 369/103 |
| 2005/0254108 | A1* | 11/2005 | Chuang | G03H 1/20 359/21 |
| 2005/0254392 | A1* | 11/2005 | Meyrueis | G11B 7/0065 369/112.01 |
| 2006/0001936 | A1* | 1/2006 | Chen | G11B 7/1362 359/35 |
| 2011/0309267 | A1* | 12/2011 | Cui | H05K 999/00 250/492.1 |
| 2012/0307250 | A1* | 12/2012 | Wang | G01N 21/1717 356/450 |
| 2013/0128714 | A1* | 5/2013 | Nakamura | G11B 7/0065 369/103 |

* cited by examiner

NON-MECHANICAL DIGITAL/HOLOGRAPHIC WIDE ANGLE CONTROL OF ONE OR MORE LASERS BEAMS

CROSS-REFERENCE TO RELATED APPLICATIONS

The present application claims priority to U.S. Provisional Patent Application Ser. No. 61/788,782, which was filed on 1 Mar. 2013.

BACKGROUND OF THE INVENTION

Field of the Invention

This invention relates in general to a device and method for non-mechanical laser beam steering, and in particular to a device and method for non-mechanical laser beam steering using holography.

Description of the Related Art

Several non-mechanical beam steering approaches have already been developed. However, these approaches have many limitations that are overcome by this invention.

In 1971 U.S. Pat. No. 3,572,895, entitled "Optical deflection system including an alternating sequence of birefringent prisms and polarizers" and incorporated herein by reference, was issued to Schmidt et al., whose device used birefringent prisms and polarizers to perform light deflection. In this patent, the refracting angles of each polarizer/prism stage by which the incident beam is slightly deflected generally form a geometrical progression with the common ratio 2. Whether or not deflection occurs at any of the factor of 2 stages depends on the controlled polarization of the light for each stage. The resulting angular deflection is essentially set as a binary number and depends on the combination of how much the beam was angularly deflected at each stage. One downside of this approach is that the size of the optics must increase in order to get wider steering angles. In addition, because a polarization approach at multiple stages is used to control deflection, it is impossible for the device to control multiple beams. This deficiency severely limits the level of laser control needed for some applications.

In 1972, a 20 stage digital light beam deflector was designed using Kerr cell birefringence and polarizers, according to Meyer, Rickmann, Schmidt, Schmidt, Rahlff, Shroder and Thust, "Design and performance of a 20-stage digital light beam deflector", Appl. Opt., vol. 11, no. 8, pp. 1732-1716, August 1972, incorporated herein by reference. Meyer et al disclosed a green laser beam deflected into 1024×1024 raster positions with a deflection rate of 500 kHz. However, this projection system only deflected light approximately +/−11 degrees. In addition, because it also controlled deflection in various stages, it did not have the ability to control multiple laser beams simultaneously.

In 1976, U.S. Pat. No. 3,980,389, entitled "Electro-optical deflection apparatus using holographic grating" and incorporated herein by reference, issued to Huignard et al. and offered a holographic grating approach to increase the angular deflection range for light deflectors. Huignard et al.'s device, required a small angle beam deflector and N holographic diffraction gratings. Each of the N gratings diffracts the light into only one of N directions. The light is angularly multiplexed so that only one of the gratings is capable of diffracting the light into a specific direction. This avoids having to control the polarization through various stages and incrementally obtaining larger angles. However, each desired direction requires a different angularly accessed grating which means it inherently has null regions. Also, since the light must pass through each grating, each one has a potential for energy loss. Since the design must be transmissive and is wavelength dependent, it is difficult if not impossible to use this device for multiband operation.

In 1999, liquid crystal technology was used to form a low-power digital light deflector, using nematic liquid crystal deflectors optimized for wide-angle steering, according to C. M. Titus. P. J. Bos, and O. D. Lavrentovich, "Efficient, accurate liquid crystal digital light deflector," Proc. SPIE, 1999, vol. 3633, p. 244, incorporated herein by reference. However, this technology consists of multiple stages of liquid crystal wedges for deflection and twisted nematic switches for polarization control. Since several polarization controlling stages are required for steering the laser beam, this approach will not support simultaneous multiple beam control. In addition, liquid crystals are only transmissive in certain spectral ranges and are generally not suitable for multiband operation. For example, they are highly absorptive in the mid-wave infrared which limits their applicability.

In 2004, liquid crystal light deflection was improved by breaking the beam steering into two stages fine angle steering followed by coarse angle steering with an added ability to focus the beam, S. A. Khan and N. A. Riza, "Demonstration of 3-dimensional wide angle laser beam scanner using liquid crystals, Opt. Express, vol. 12, no, 5, pp. 868-882. Mar. 8, 2004. However, as stated before, since multiple polarization controlling stages are required for steering the laser beam, this approach will not support simultaneous multiple beam control.

In 2007, U.S. Pat. No. 7,215,472, entitled "The Wide-angle beam steering system" and incorporated herein by reference, issued to Smith et al. Smith et al.'s device requires sets of azimuth and elevation gratings to get large deflection angles as in U.S. Pat. No. 3,950,359 but attempts to improve on the design by adding several stages of optical phased arrays ("OPA") which can reduce the null regions. However, the OPAs add more complexity to the multiple stages, are another potential source for loss and may have cross talk. In addition, in order to decrease the null regions, they need to use OPAs to control the deflection at more than one stage which now prevents the device from being able to control multiple beams simultaneously.

BRIEF SUMMARY OF THE INVENTION

An embodiment of the invention, includes an apparatus including a laser producing a plane wave beam. The apparatus further includes a first beam splitter splitting the plane wave beam into a first reference laser beam and at least one ideal input beam. The apparatus further includes at least one second beam splitter. The apparatus further includes an angle-magnifying optical element, the at least one second beam splitter reflecting the at least one ideal input beam through the angle-magnifying optical element to generate at least one distorted input beam. The apparatus further includes a local plane array receiving the first reference laser beam and the at least one distorted input beam and recording at least one interference pattern generated by the first reference laser beam and the at least one distorted input beam. The apparatus further includes a spatial light modulator generating the at least one recorded interference pattern and receiving the reference laser beam to generate at least one time-reversed output beam. The spatial light modulator transmitting the at least one time-reversed output beam through the angle-magnifying optical element.

Optionally, the at least second beam splitter comprises a movable beam splitter having a plurality of positions to reflect a plurality of input beam angles.

Optionally, the at least one ideal input beam comprises a plurality of ideal input beams. The at least one second beam splitter comprises a plurality of fixed beam splitters oriented to reflect the plurality of ideal input beams toward the angle-magnifying element.

Optionally, the spatial light modulator 110 is a transmissive spatial light modulator, a reflective spatial light modulator, a binary amplitude control spatial light modulator, an analog amplitude control spatial light modulator, a binary phase control spatial light, modulator, and/or an analog phase control spatial modulator.

Optionally, the laser comprises a laser wavelength. The focal plane array comprises a wavelength sensitivity that encompasses the laser wavelength.

Optionally, the angle-magnifying optical element comprises a simple lens or a telescope.

Another embodiment of the instant invention includes a method. A first reference laser bean is transmitted from a laser. The first reference laser beam is partially reflected into a focal plane array at a reference beam angle using a first beam splitter. The first reference laser beam is partially transmitted onto at least one second beam splitter using the first beam splitter. The first reference laser beam is reflected using the least one second beam splitter toward an angle-magnifying optical element, thereby generating at least one ideal input beam. The at least one ideal input beam is transmitted at at least one ideal input, beam angle through the angle-magnifying optical element toward the focal plane array, thereby generating at least one distorted input beam. At least one interference pattern generated by the reference beam and the at least one distorted input beam is recorded using the focal plane array. The recorded at least one interference pattern is transmitted using a spatial light modulator. A second reference laser beam is transmitted at the reference beam angle onto the spatial light modulator, thereby generating a t ne-reversed output beam from the recorded at least one interference pattern and the reference beam. The second reference laser beam has a same wavelength as the first reference laser beam. The time-reversed output beam is transmitted by the spatial light modulator through the angle-magnifying optical element.

Optionally, the at least one ideal input beam comprises a plurality of ideal input beams, the at least one distorted input beam comprises a plurality of distorted input beams, and the at least one interference pattern comprises a plurality of interference patterns. In such an embodiment of the invention, the method further includes the following. The plurality of interference patterns is recorded using the focal plane array. The recorded plurality of interference patterns is successively transmitted using the spatial light modulator so as to steer the time-reversed output beam.

Optionally, the at least one second beam splitter is moved to generate the plurality of ideal input beams.

Optionally, the at least one second beam splitter includes a plurality of fixed second beam splitters. The reflecting the first reference laser beam using the least one second beam splitter comprises reflecting the first reference laser beam using the plurality of fixed second beam splitters, wherein the at least one ideal input beam includes a plurality of ideal input beams. Optionally, each fixed second beam splitter of the plurality of second beam splitters generates a respective ideal input beam of the plurality of ideal input beams.

An embodiment of the invention control the wavefront of an incident light field so that a far field laser beam can be controlled and directed or so that multiple far field laser beams can be independently controlled and directed simultaneously.

An embodiment of the invention controls deflection by adjusting the wave front of an incident light field with an SLM. Since deflection does not occur incrementally at multiple stages, it is capable of controlling multiple beams simultaneously. Because the wavefront is being manipulated by an SLM, it can be shaped in a manner that allows reversal of distortion effects due to angularly amplifying lenses/optical systems and makes it possible to use low cost optics for the angular magnification without a distortion penalty. Because a device according to the instant invention does not depend on the type of SLM used, it can use reflective SLMs which will enable a single device to be designed for use over a wide range of wavelengths. In addition, because the wavefront of the incident light field is being controlled, it can control the beam in a manner that allows the laser to be focused or defocused at various ranges along the propagation direction.

DETAILED DESCRIPTION OF THE INVENTION

Figure 1:
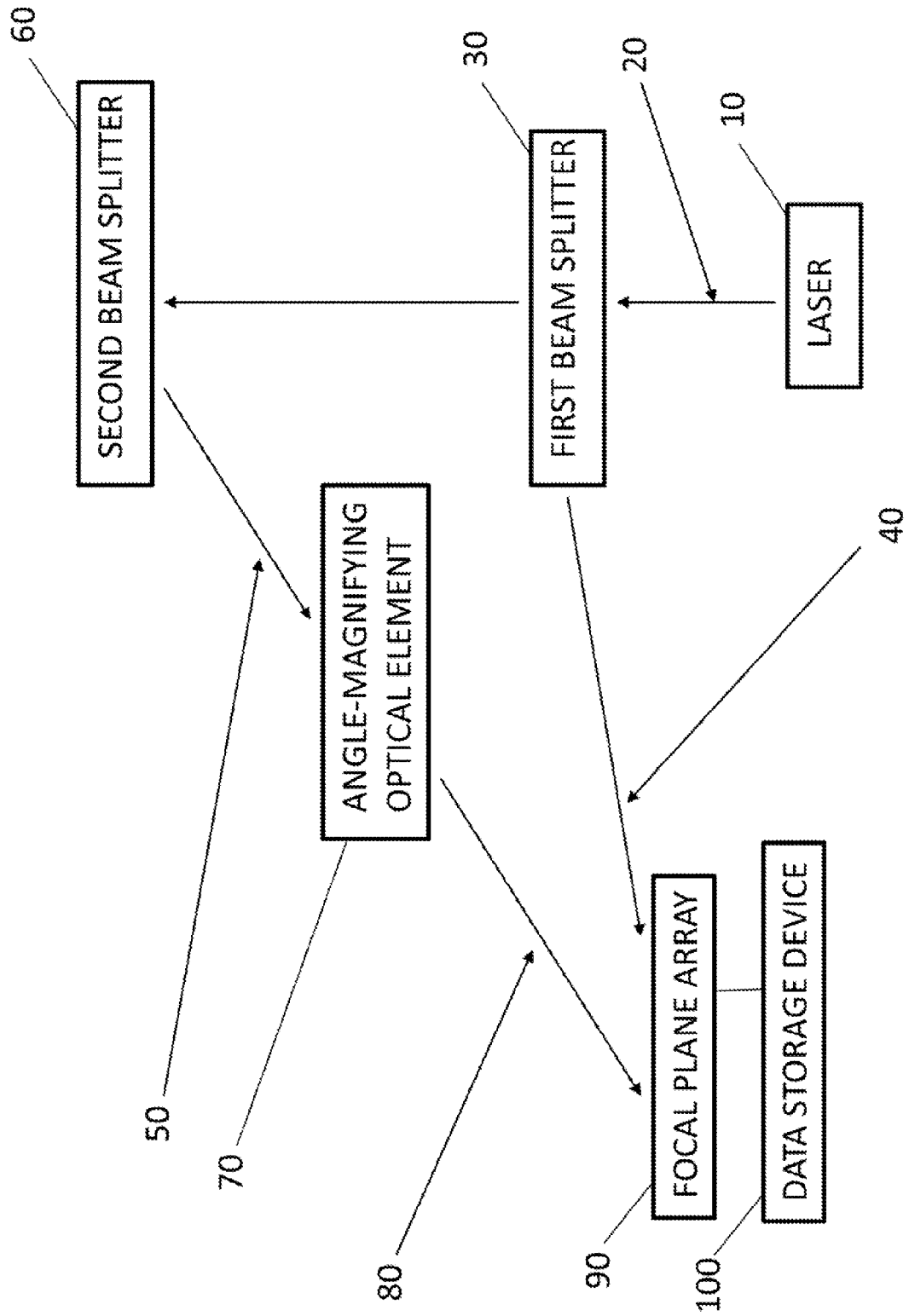
FIG. 1 is a partial block diagram of an apparatus embodiment of the instant invention.

Embodiments of the invention is described as follows with reference to FIGS. 1, 2, and 4. As shown by way of illustration in FIG. 1, the embodiments include an apparatus including a standard laser 10 producing a plane wave beam 20. The apparatus further includes a standard first beam splitter 30 splitting the plane wave beam 20 into a first reference laser beam 40 and at least one time-forward ideal input beam 50. The apparatus further includes at least one standard second beam splitter 60. The apparatus further includes a standard angle-magnifying optical element 70, the at least one second beam splitter 60 reflecting the at least one time-forward ideal input beam 50 through the angle-magnifying optical element 70 to generate at least one distorted input beam 80. The apparatus further includes a standard focal plane array 90 receiving the first reference laser beam 40 and the at least one distorted input beam 80 and recording at least one interference pattern generated by the first reference laser beam and the at least one distorted input beam. As an example, the focal plane array 90 records the at least one interference pattern on a standard data storage device or medium 100. Illustrative data storage devices include hard drives, flash drives, and optical disks. As shown by way of illustration in FIG. 2, the apparatus further includes a standard spatial light modulator 110 ("SLM") generating the at least one recorded interference pattern and receiving the reference laser beam 40 to generate at least one time-reversed non-ideal output beam 120. As an example, the spatial light modulator retrieves the at least one recorded interference pattern from the data storage device or medium 100, or from a copy of the originally recorded interference pattern. The spatial light modulator 110 transmits the at least one time-reversed non-ideal output beam 120 through the angle-magnifying optical element 70, thereby generating a time-reversed ideal output beam 130 corresponding to the time-forward ideal input beam 50. Because a time-reversed beam is output, an embodiment of the invention has the advantage of removing non-ideal lens effects, which are exacerbated by larger fields of regard, and offers the potential to utilize low cost non-ideal optics.

Optionally, the at least second beam splitter 60 comprises a movable beam splitter having a plurality of positions to reflect a plurality of input beam angles. As an example, for a single ideal input beam, the first beam splitter 30 reflects 50% and transmits 50% of the incoming plane wave beam from the laser 10. The at least one second beam splitter 60 reflects 100% of the incoming light transmitted through the first beam splitter 30.

Figure 2:
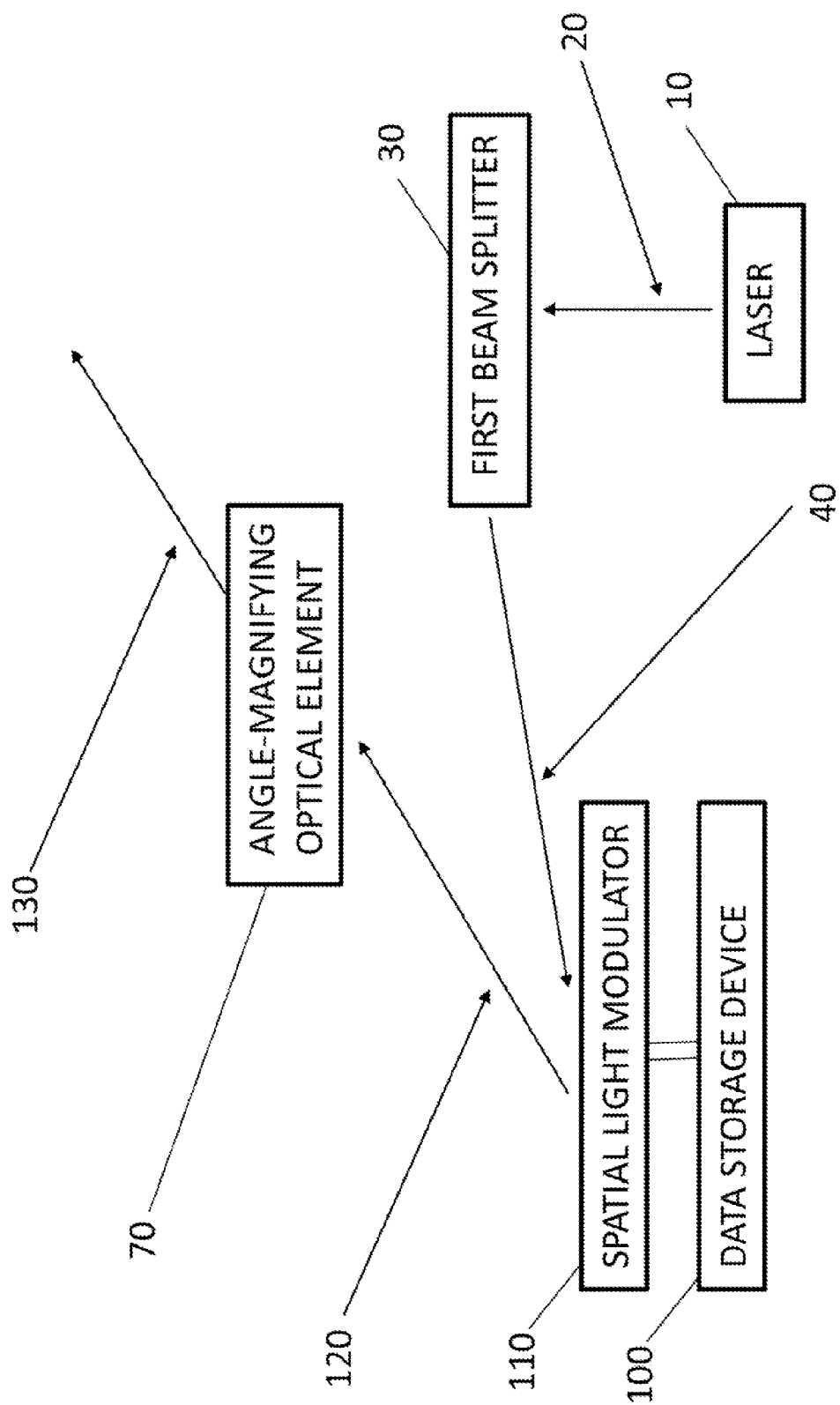
FIG. 2 is another partial block diagram of an apparatus embodiment of the instant invention.
Figure 3:
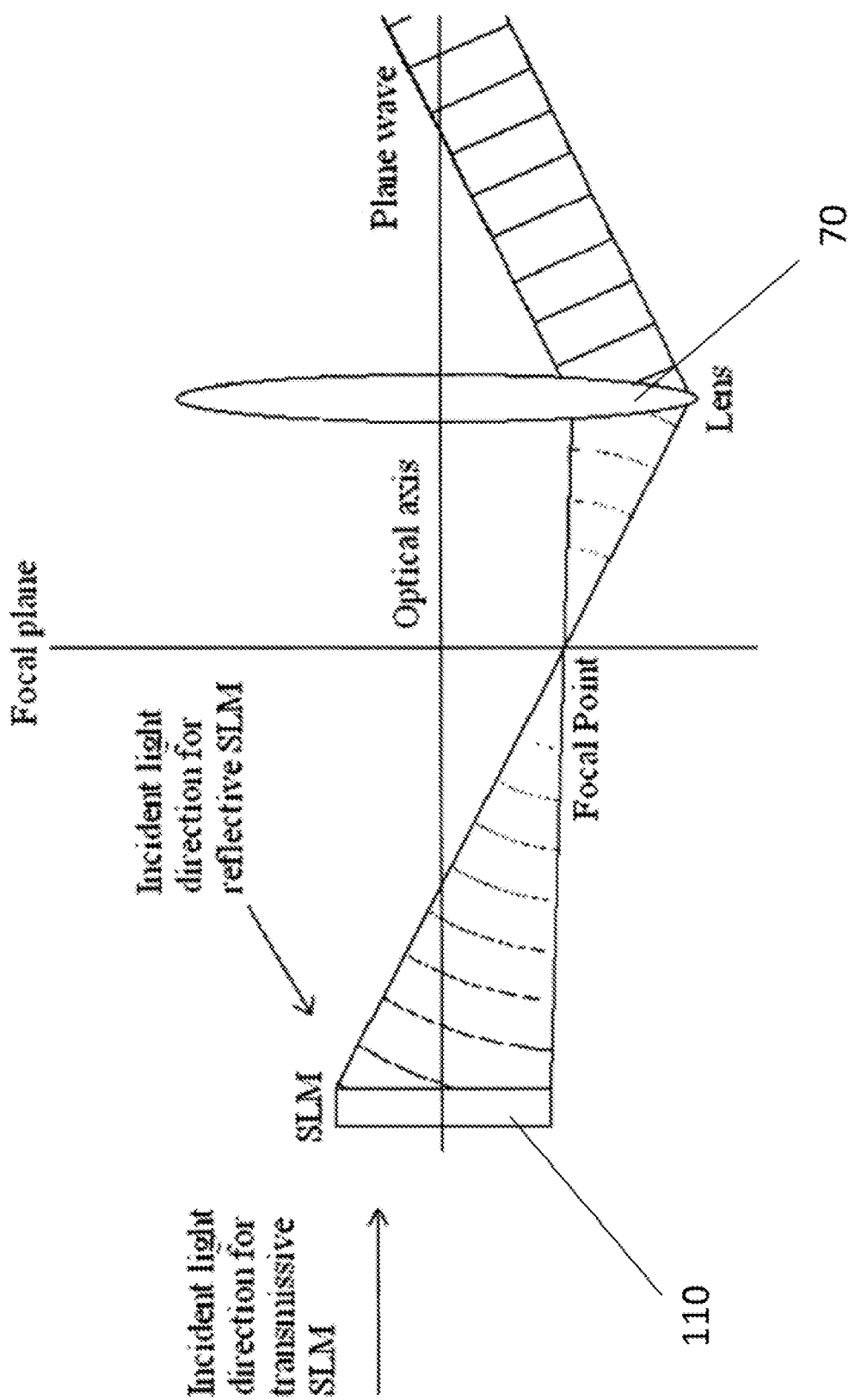
FIG. 3 is an optics diagram, showing an illustrative optical wave progression for the apparatus embodiment shown in FIG. 1.

SLM single laser beam control is discussed with illustrative reference to FIGS. 2 and 3. Light focused to a point has a wavefront with a spherical form as it converges and diverges from its focal point, it is relatively straightforward to use an SLM 110 to manipulate an input light field in this manner and focus light to a point. For a lens 70, light emitted from an arbitrary point at the focal plane of the lens, in the far field, results in a plane wave at a specific direction. The direction of the plane wave is determined by the light point location and focal length of the lens. The further the light point is from the optical axis on the focal plane, the greater the angle with respect to the optical axis of the plane wave formed. The shorter the focal length of the lens, the greater the angle with respect to the optical axis of the plane wave formed for a given offset of the light point from the optical axis. By using SLM 110 to manipulate the wavefront and focus light toward a lens 70, at the focal plane of the lens, one can generate a far field plane wave in an arbitrary direction relative to the optical axis. SLMs have a limited field of regard due to the size of their individual elements. The combination of the finite field of regard of the SLM 110, the focal length of the lens 70 and the distance of the SLM 110 to the angle-magnifying optical element 70 determines the limits for the field of regard of the plane waves generated by an embodiment of the invention.

Illustrative SLM settings storage is described as follows. The SLM settings for a specific plane wave beam direction relative to the optical axis can be determined in advance. This can be determined computationally and/or using measurements. Therefore, one can digitally store a library of SLM settings for any set of plane waves desired, if one wants to form a plane wave in one of the stored directions, one simply needs to recall the corresponding SLM settings, and then imprint the settings onto the SLM. If one has enough directions stored so that the SLM parameters can be interpolated, an interpolation algorithm can be used to steer the plane wave to a continuum of locations within the field of regard. Embodiments of the instant invention are not constrained to a lens for increasing the plane wave direction field of regard but can be extended to any optical system used to increase the field of regard.

Optionally, the at least one ideal input beam comprises a plurality of ideal input beams. As shown by way of illustration in FIG. 4, the at least one second beam splitter comprises a plurality of fixed second beam splitters 62, 64, 66 oriented to reflect the plurality of ideal input beams toward the angle-magnifying element. As an example, if two ideal input beams are desired, then first beam splitter 30 reflects 33 ⅓% and transmits 66 ⅔% of the incoming light, second beam splitter #2 64 reflects 50% and transmits 50% of the incoming light, second beam splitter #1 62 reflects 100% of the incoming light, and second beam splitter #3 66 reflects 100% of the incoming light. It should be understood that in other embodiments of the invention, additional second beam splitters are employed to generate additional ideal input beams with correspondingly selected transmission and reflection characteristics.

Figure 4:
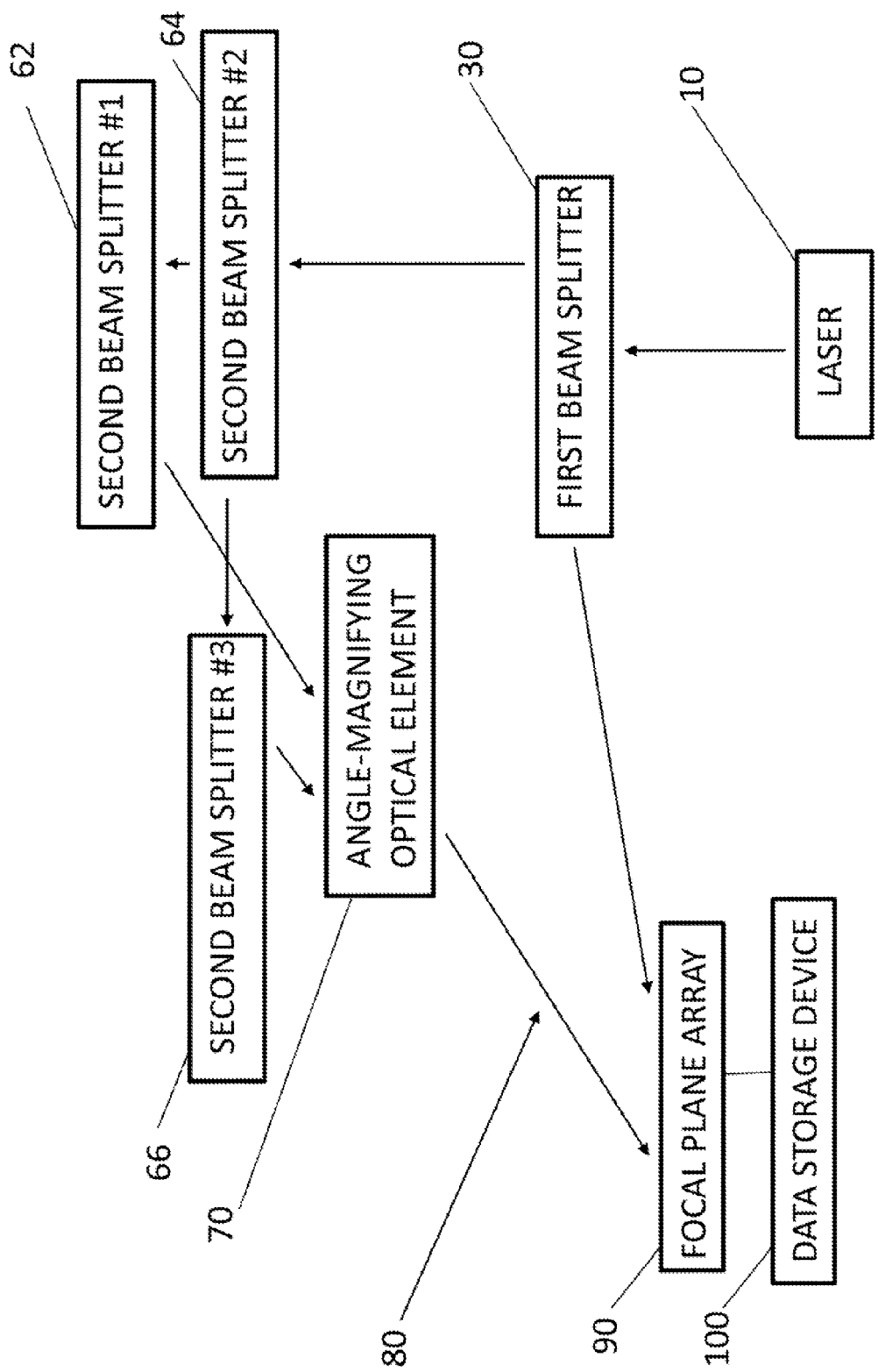
FIG. 4 is an alternative partial block diagram of an apparatus embodiment of the instant invention.
Figure 5:
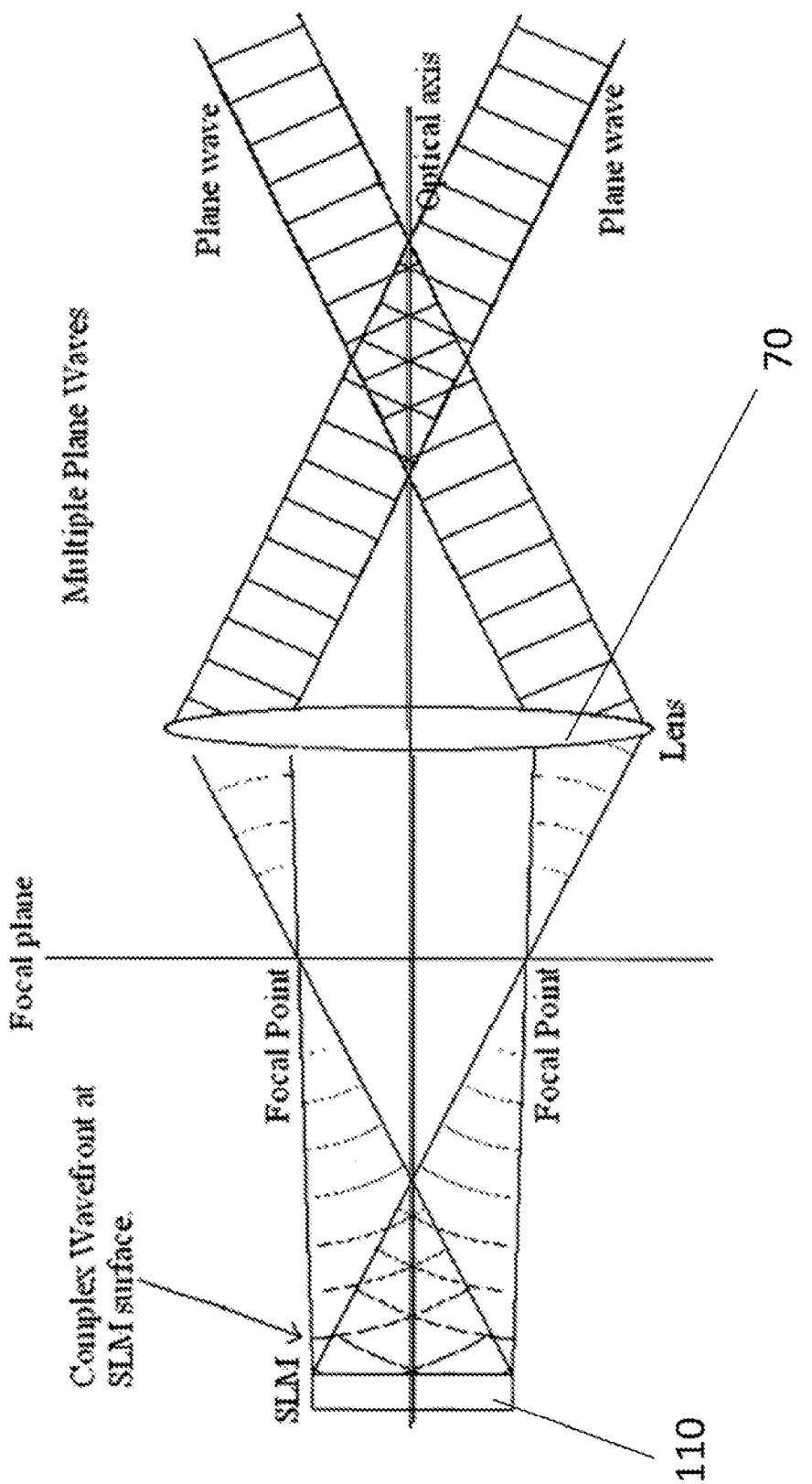
FIG. 5 is an optics diagram, showing an illustrative optical wave progression for the apparatus embodiment shown in FIG. 4.
Figure 6:
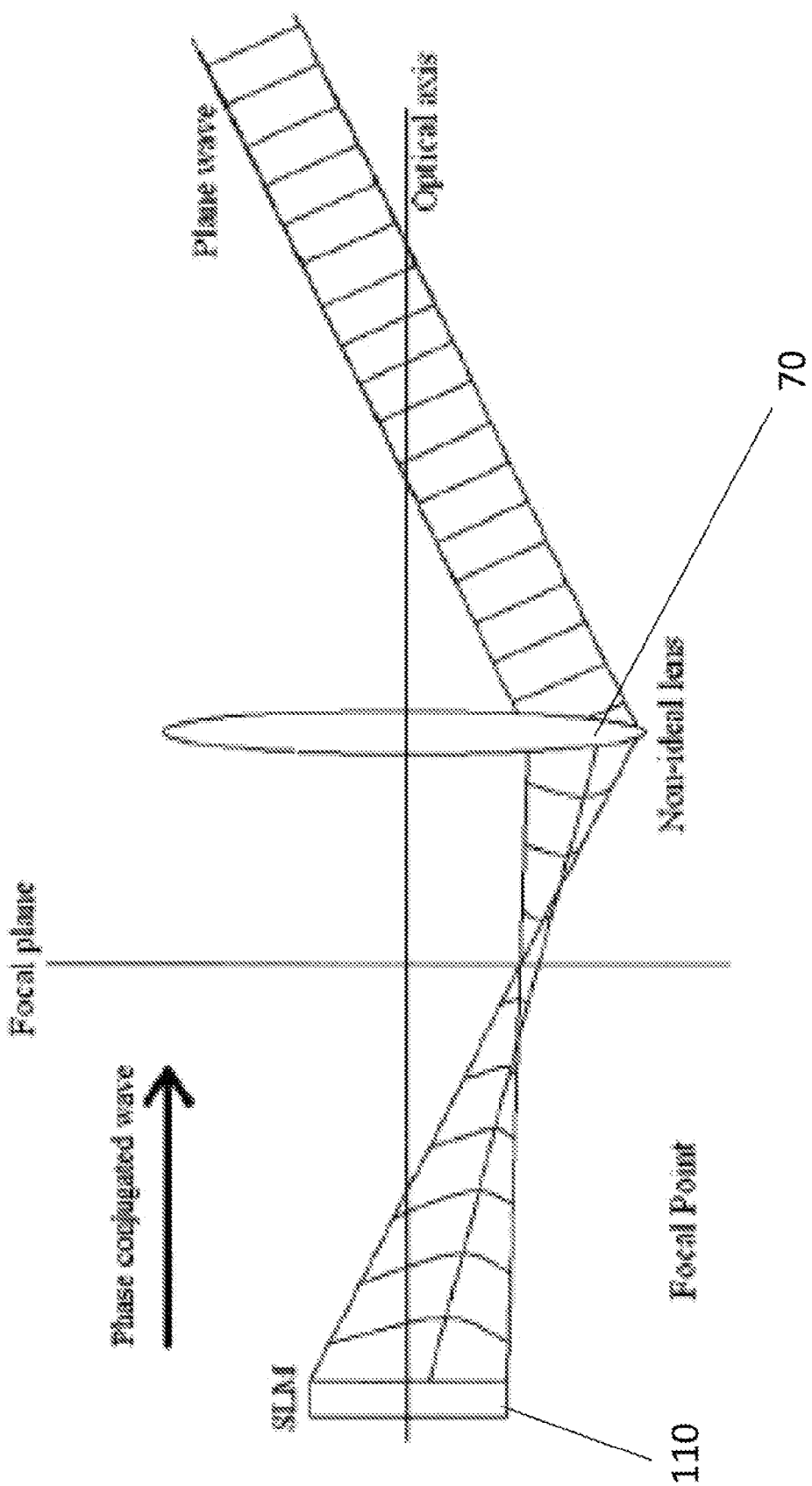
FIG. 6 is an optics diagram, showing an illustrative optical wave progression for the apparatus embodiment to compensate for non-ideal lens distortions.

SLM multiple laser beam control is discussed with illustrative reference to FIGS. 4-6. For over a decade, people have been using spatial light modulators to form holograms, e.g., Coomber, Stuart D.; Cameron, Colin D.; Hughes, Jonathon R.; Sheerin, David T.; Slinger, Christopher W.; Smith, Mark A.; Stanley, Maurice (QinetiQ), "Optically addressed spatial light modulators for replaying computer-generated holograms", Proc. SPIE Vol. '4457', p. 9-19 (2001), incorporated herein by reference. Holograms are capable of generating real and virtual images of arbitrary objects by forming complex wavefronts at the SLM surface. A point of light can be considered the simplest of objects. Applicant appreciated that holograms are capable of generating one or more arbitrary points of light simultaneously. Applicant then appreciated that spatial light modulators, used for hologram generation, can generate one or more arbitrary plane waves simultaneously. Applicant, further appreciated that non-ideal lenses, such as angle-magnifying optical element 70, typically bend light non-ideally and cause distortion. Applicant finally recognized that by using the SLM 110 to properly manipulate the wavefront and cause phase conjugation, one can compensate for non-ideal lens distortions created by angle-magnifying optical element 70, such as shown by way of illustration in FIG. 6.

Spatial light modulators can manipulate light dynamically. They can be used to form amplitude and/or phase holograms. Optionally, the spatial light modulator 110 is to transmissive spatial light modulator, a reflective spatial light modulator, a binary amplitude control spatial light modulator, an analog amplitude control spatial light modulator, a binary phase control spatial light modulator, and/or an analog phase control spatial modulator. Illustrative spatial light, modulator according to an embodiment of the invention include a) Texas Instruments OLP (Cinema), On/Off (Binary), 1024×1024, 7.6 μm mirrors, (4 k arrays available soon), Frame rates>32 kHz; and b) Boulder Nonlinear Systems, PHASE Modulation, variable Deflection (Grayscale), 512×512, 37.5 μm actuators, Frame Rate ~1 kHz; and c) Fraunhofer Institute Variable Deflection (Grayscale), 2048×512, 16 μm mirrors, Frame Rates>2 kHz.

Optionally, the laser 10 comprises a laser wavelength. The focal plane array 90 comprises a wavelength sensitivity that encompasses the laser wavelength.

Optionally, the angle-magnifying optical element 70 comprises a simple lens or a telescope.

Illustrative SLM settings storage is described as follows. The SLM settings for a specific plane wave beam direction relative to the optical axis can be determined in advance. This can be determined computationally and/or using measurements. Therefore, one can digitally store a library of SLM settings for an set of plane waves desired. If one wants to firm a plane wave in one of the stored directions, one simply needs to recall the corresponding SLM settings, and then imprint the settings onto the SLM. If one has enough directions stored so that the SLM parameters can be interpolated, an interpolation algorithm can be used to steer the plane wave to a continuum of locations within the field of regard. Embodiments of the invention are not constrained to a lens for increasing the plane wave direction field of regard but can be extended to any optical system used to increase the field of regard.

Another embodiment of the instant invention includes a method. A first reference laser beam is transmitted from a laser 10. The first reference laser beam is partially reflected onto a focal plane array 90 at a reference beam angle using a first beam splitter 30. The first reference laser beam is partially transmitted onto at least one second beam splitter 60 using the first beam splitter 30. The first reference laser beam is reflected using the at least one second beam splitter 60 toward an angle-magnifying optical element, thereby generating at least one ideal input beam. The at least one ideal input beam is transmitted at at least one ideal input beam angle through the angle-magnifying optical element 70 toward the focal plane array 90, thereby generating at least one distorted input beam 80.

At least one interference pattern generated by the reference beam and the at least one distorted input beam 80 is recorded using the focal plane array 90. The recorded at least one interference pattern is transmitted using a spatial light modulator 110. A second reference laser beam is transmitted at the reference beam angle onto the spatial light modulator 110, thereby generating a time-reversed output beam from the recorded at least one interference pattern and the reference beam. The second reference laser beam has a same wavelength as the first reference laser beam. The time-reversed output beam is transmitted through the angle-magnifying optical element 70.

Optionally, the at least one ideal input beam comprises a plurality of ideal input beams, the at least one distorted input beam 80 comprises a plurality of distorted input beams, and the at least one interference pattern comprises a plurality of interference patterns. In such an embodiment of the invention, the method further includes the following. The plurality of interference patterns is recorded using the focal plane array 90. The recorded plurality of interference patterns is successively transmitted using the spatial light modulator 110 so as to steer the time-reversed output beam.

Optionally, the at least one second beam splitter 60 is moved to generate the plurality of ideal input beams.

Optionally, the at least one second beam splitter includes a plurality of fixed second beam splitters 62, 64, 66. The reflecting the first reference laser beam using the at least one second beam splitter comprises reflecting the first reference laser beam using the plurality of fixed second beam splitters, wherein the at least one ideal input beam includes a plurality of ideal input beams. Optionally, each fixed second beam splitter of the plurality of second beam splitters generates a respective ideal input beam of the plurality of ideal input beams.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

These and other implementations are within the scope of the following claims.

What is claimed as new and desired to be protected by Letters Patent of the United States is:

1. An apparatus comprising:
   a laser producing a plane wave beam;
   a first beam splitter splitting the plane wave beam into a first reference laser beam and at least one ideal input beam;
   at least one second beam splitter;
   an angle-magnifying optical element, said at least one second beam splitter reflecting the at least one ideal input beam through said angle-magnifying optical element to generate at least one distorted input beam;
   a focal plane array receiving said first reference laser beam and said at least one distorted input beam and recording at least one interference pattern generated by said first reference laser beam and said at least one distorted input beam; and
   a spatial light modulator generating said at least one recorded interference pattern recorded by said focal plane array and receiving said reference laser beam to generate at least one time-reversed output beam;
   said spatial light modulator transmitting said at least one time-reversed output beam through said angle-magnifying optical element.

2. The apparatus according to claim 1, wherein said at least second beam splitter comprises a movable beam splitter having a plurality of positions to reflect a plurality of input beam angles.

3. The apparatus according to claim 1, wherein said at least one ideal input beam comprises a plurality of ideal input beams, said at least one second beam splitter comprising a plurality of fixed beam splitters oriented to reflect said plurality of ideal input beams toward said angle-magnifying element.

4. The apparatus according to claim 1, wherein said spatial light modulator is at least one of a transmissive spatial light modulator, a reflective spatial light modulator, a binary amplitude control spatial light modulator, an analog amplitude control spatial light modulator, a binary phase control spatial light modulator, and an analog phase control spatial modulator.

5. The apparatus according to claim 1, wherein said laser comprises a laser wavelength, said focal plane array comprising a wavelength sensitivity that encompasses the laser wavelength.

6. The apparatus according to claim 1, wherein said angle-magnifying optical element comprises one of a simple lens and a telescope.

7. A method comprising:
   transmitting a first reference laser beam from a laser;
   partially reflecting the first reference laser beam onto a focal plane array at a reference beam angle using a first beam splitter;
   partially transmitting the first reference laser beam onto at least one second beam splitter using the first beam splitter;
   reflecting the first reference laser beam using the least one second beam splitter toward an angle-magnifying optical element, thereby generating at least one ideal input beam;
   transmitting the at least one ideal input beam at at least one ideal input beam angle through the angle-magnifying optical element toward the focal plane array, thereby generating at least one distorted input beam;
   recording at least one interference pattern generated by the reference beam and the at least one distorted input beam using the focal plane array;
   transmitting the recorded at least one interference pattern using a spatial light modulator;

transmitting a second reference laser beam at the reference beam angle onto the spatial light modulator, thereby generating a time-reversed output beam from the recorded at least one interference pattern and the reference beam, the second reference laser beam comprising a same wavelength as the first reference laser beam;

transmitting the time-reversed output beam through the angle-magnifying optical element.

8. The method according to claim 7, wherein the at least one ideal input beam comprises a plurality of ideal input beams, the at least one distorted input beam comprises a plurality of distorted input beams, and the at least one interference pattern comprises a plurality of interference patterns, said method further comprising:

recording the plurality of interference patterns using the focal plane array; and successively transmitting the recorded plurality of interference patterns using the spatial light modulator so as to steer the time-reversed output beam.

9. The method according to claim 7, further comprising:

moving the at least one second beam splitter to generate the plurality of ideal input beams.

10. The method according to claim 7, wherein the at least one second beam splitter comprises a plurality of fixed second beam splitters, wherein said reflecting the first reference laser beam using the least one second beam splitter comprises reflecting the first reference laser beam using the plurality of fixed second beam splitters, wherein the at least one ideal input beam comprises a plurality of ideal input beams.

11. The method according to claim 10, wherein each fixed second beam splitter of the plurality of second beam splitters generates a respective ideal input beam of the plurality of ideal input beams.

* * * * *

UNITED STATES PATENT AND TRADEMARK OFFICE
CERTIFICATE OF CORRECTION

Page 1 of 1

PATENT NO. : 9,575,464 B2
APPLICATION NO. : 14/205803
DATED : February 21, 2017
INVENTOR(S) : Vincent A. Cassella It is certified that error appears in the above-identified patent and that said Letters Patent is hereby corrected as shown below:

On the Title Page

(73) should read: the Government of the United States, as represented by the Secretary of the Navy Signed and Sealed this
Tenth Day of April, 2018

Andrei Iancu
*Director of the United States Patent and Trademark Office*